United States Patent [19]

Fritz

[11] Patent Number: 4,511,218

[45] Date of Patent: Apr. 16, 1985

[54] ELECTRO-OPTICAL DISPLAY DEVICE AND METHOD FOR ITS PRODUCTION

[75] Inventor: Bernd Fritz, Lauffen, Fed. Rep. of Germany

[73] Assignee: ITT Industries, Inc., New York, N.Y.

[21] Appl. No.: 441,049

[22] Filed: Nov. 12, 1982

[30] Foreign Application Priority Data

Dec. 28, 1981 [DE] Fed. Rep. of Germany ....... 3151557

[51] Int. Cl.³ .......................... G02F 1/133; C25F 1/00
[52] U.S. Cl. .................................. 350/356; 204/141.5; 252/518; 350/336; 350/357; 427/87; 427/88
[58] Field of Search ............... 350/356, 336, 392, 357, 350/363, 391; 174/126 CP; 427/86–88, 123, 126.2, 443.2; 357/10; 252/512, 518; 204/141.5

[56] References Cited

U.S. PATENT DOCUMENTS

| Re. 23,556 | 9/1952 | Mochel | 252/518 |
| 2,643,199 | 6/1953 | Hersch | 427/88 |
| 2,773,023 | 12/1956 | Raynes et al. | 204/141.5 |
| 2,822,299 | 2/1958 | Nobel | 427/88 |
| 3,042,593 | 7/1962 | Michlin | 204/141.5 |
| 3,390,012 | 6/1968 | Haberecht | 427/122 |
| 3,523,039 | 8/1970 | Ramsey, Jr. | 427/87 |
| 3,928,658 | 12/1975 | Boxtel et al. | 350/336 |

FOREIGN PATENT DOCUMENTS 36-23871 12/1961 Japan ................................ 204/141.5

*Primary Examiner*—William H. Punter
*Attorney, Agent, or Firm*—James B. Raden; William J. Michals

[57] ABSTRACT

An electro-optical display device including a substrate which carries a layer of electrodes containing one or more semi-conductive metal oxides. Over particular sections of its surface the layer of electrodes is provided with a metal coating. In these sections (25) the layer of electrodes (20) includes a portion (22) of the metals in elementary condition, which portion becomes greater from the area (A) adjacent to the substrate to the area (0) facing away from the substrate. The metals are available in combined condition in the semi-conductive metal oxides.

4 Claims, 5 Drawing Figures

ELECTRO-OPTICAL DISPLAY DEVICE AND METHOD FOR ITS PRODUCTION

BACKGROUND OF THE INVENTION

This invention relates to an electro-optical display device including the features of the invention.

Various types of electro-optical display devices and units are known, namely electro-optical display devices having liquid crystals or colloidal disperse systems as electro-optical material, electrochromic display devices and electrophoretic display devices. All of these display devices are passive display devices including the common feature that a cell is available which is limited by two parallel substrates. The substrates are held at a spacing of a few micrometers by a sealing material which may include spacing elements in such a way that a cell or a chamber is formed for the active electro-optical material. The first substrate in the direction of view is thereby always transparent and carries transparent electric conducting layers or electrodes whose shape corresponds to the signs or numerals to be indicated. The second substrate can either be transparent or not and also carries electrodes. The display device can be activated by applying a voltage to the electrodes. Such electro-optical display devices can indicate a plurality of conditions of an object to be measured, when the electrodes are subdivided in individual segments, which are for example controllable through an integrated circuit.

Semiconductive metal oxides, such as indium trioxide and tin(IV) oxide were successful in the practice. The preferred conducting layer material on the basis of indium trioxide is available under the trade name ITO. This material can be surfaced on a substrate by vaporising, vacuum sputtering or similar methods either in layers having the shape of the desired pattern of electrodes or as a single coherent layer in which the desired pattern of electrodes is provided thereafter by etching. Substrates surfaced with a thin coherent layer with a thickness of a few nanometers, for example glass plates coated with ITO, are available on the market.

The segments of the electrodes shaped in accordance with the desired pattern in addition to the sections positioned in the indicating area of the completed display device also include sections which lead to one of the borders of the substrate and via which the electric connection is effected. These areas are called metal conductors.

However the layer of electrodes cannot be directly provided with through-connections or bonded with metallic connecting leads normally made from copper or aluminium by usual physical methods of semi-conductor technology, such as soldering or ultrasonic welding, because the materials do not stick together. Moreover the layers have a relatively high electronic resistance, so that the metal conductors have to be supplied with voltages higher than desired in order to operate such a display device. Due to the high resistance the time constant of time delay after the expiration of which such a display device responds to an applied voltage, is also higher than desired. On these grounds it is necessary to provide the electrodes of the metal conductors with a metal coating.

On principle it would be possible to deposit a thin metal coating directly on a layer of semi-conductive metal oxides by means of metallising, vacuum sputtering or similar methods. When the metal is deposited in such a way the adhesion is effected by jamming the micro crystals mechanically. Due to the differing crystal lattices and lattice binding energies there is no diffusion or formation of mixed crystals between the metal coating and the layer of semiconductive metal oxides. This is why many metals stick to the layer only insufficiently, so that one is restricted in chosing the material or has to rely on depositing intermediate layers. As for instance the German specification OS No. 2,807,350 shows two chromium intermediate layers have to be deposited in order to be able to produce an adherent gold coating or an iron layer has to be deposited in order to be able to produce an adherent nickel coating. The intermediate layers and the coating are surfaced by vaporising or spraying. These methods require a high amount of energy and technology.

It is an object of the present invention to create an appropriate substrate for an electro-optical display device and that the electrode layer of this substrate, which layer includes one or more semi-conductive metal oxides, and the metal coatings used for electro-optical display devices directly adhere to this electrode layer. The substrate and thus the entire electro-optical display device is to be produced simply and economically.

SUMMARY OF THE INVENTION

This problem is solved by the present invention. By this measure the layer becomes more metallic in its physical and chemical qualities, so that it can more easily be provided with a metal coating than a layer entirely consisting of semi-conductive metal oxides. Due to the fact that the metals which are distributed in elementary condition in the layer are the same as the metals compounded as oxides it has not to be feared that the qualities of the layer change in an undesired way. Because the ratio of elementary metals is greatest in the surface of the layer not facing the substrate the electric resistance is very low there. If then a metal coating is surfaced on this area the difference between the electric resistances of the adjacent areas of the layer of electrodes and the metal coating is not so great any more, so that it can be expected that the display device responds more rapidly. Because the ratio of elementary metals is smallest in the area of the layer bordering the substrate it has not to be feared that the layer will be separated from the substrate.

Thereby the practice showed that it is best, when the areas of the layer close to the substrate consist completely of semi-conductive metal oxides and only in the last fifth to tenth part of the entire thickness of the layer includes a ratio of elementary metals continuously increasing from zero to one hundred percent.

The substrate according to the invention can both be used for electric display devices in which the layers of electrodes are only to be provided with a metal coating in particular areas, namely on that part of the metal conductors not positioned in the visible indicating area of the completed display device, and for electro-optical display devices in which the layer of electrodes is to be provided with a metal coating also in the indicating area, as it is for instance known for display devices operated by reflection.

Further advantageous embodiments of the invention are described by way of embodiments in which the layer is only provided with a metal coating in particular areas, namely on that part of the metal conductors not positioned in the visible sections of the indicating area of a completed display device.

Other embodiments describe a method according to which an electro-optical display device according to the invention can be produced. The process steps for the production of a layer in accordance with the invention, include the deposition of metal on the layer according to the invention and further process steps for the production of the electro-optical display device according to the invention.

In the first process step it is shown that the layer according to the invention can be produced by treating a layer arranged on the substrate with hydrogen under conditions which are insufficient for a complete reduction of the oxides. In this case the layer could be produced by catalytically activated hydrogen in a gas stream at an increased temperature. A considerably smaller amount of technology and energy and a simpler series production is, however, possible, when the hydrogen is produced by electrolysis of a hydrous solution of electrolytes. As is known the electrolysis is to be understood as a decomposition of a chemical compound effected by electric current under ionic discharge, wherein:

at the cathode electrons are taken up by the ions, that is to say reduced and at the anode electrons are given off, that is to say oxidised.

When thus the substrate is switched as a cathode, the following reduction scheme is valid for the electrolysis:

A. Cathode: 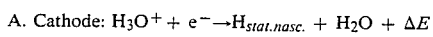
$H_3O^+ + e^- \rightarrow H_{stat.nasc.} + H_2O + \Delta E$ B. Substrate: 
$M O + xH_{stat.nasc.} \rightarrow \frac{x}{2} H_2 + M + \Delta E$ wherein
MO = semi-conductive metal oxides (indium trioxide, tin(IV) oxide)
M = metals (indium, tin)
E = entalphy of formation Any salt solution is suitable as a solution of electrolytes which, during the electrolysis, hydrogen is set free at the cathode, but does not include pronouncedly oxidising groups (such as the hypochlorite, chlorite and chlorate nitrate groups), because they hinder or prevent the reactions A and B.

Any metal is suitable as an anode, which metal is not attacked by any one of the decomposition products produced during the electrolysis.

However under present circumstances it is not possible to produce on the substrate a layer of semi-conductive metal oxides with a uniform thickness by a simple suspension in the solution of electrolytes, which layer only includes a relatively small proportion of metals in elementary condition. As a first-class conductor the metal anode has the lowest specific resistance, the salt solution dissociated in ions as a second-class conductor has a greater specific resistance and the semi-conductive metal oxides have the greatest specific resistance. Because the electric resistance of a body is the greater the higher its specific resistance, the larger its length and the smaller its thickness are and all three criteria are valid for the layer of semi-conductive metal oxides, thus the electric resistance of the layer in the present system is greatest. Due to the fact that that body is heated up most upon passage of electric current which body has the greatest electric resistance due to the small thickness of the layer which, in addition, is not to be reduced over its entire thickness, one has to pay great attention to not reducing the entire semi-conductive metal oxides to elementary metal.

Moreover, when a voltage is applied to cathode and anode, the area of the greatest density of a solution of electrolytes is close to the surface. Therefore hydrogen is set free from the water there. The consequence is that a reduction process takes place only in the areas close to the surface of the solution of electrolytes, thus at the dipping edge. In this section the layer of semi-conductive metal oxides is reduced over its entire thickness and the coherent layer is destroyed during this process, because the precipitated metals alone do not stick to the substrate.

This is why the substrate coated with semi-conductive metal oxides has to be pulled out or dipped into the electrolyte during the electrolysis. This alone enables the reduction zone to move over the entire surface of the layer without destroying it in any one area.

If not only the surface, but also deeper levels of the layer are to be reduced, the retention time of the substrate in the solution of electrolysis may not fall below a given value. In order to be able to reduce according to the invention one tenth to one fifth of the entire thickness of the layer, the best result was achieved, as the practice showed, by a layer consisting of indium trioxide and tin(IV) oxide at a velocity of 10 cm/min and a current density of about 70 mA/sq.dm.

The practice showed that with regard to production technique it is reasonable to coat the entire surface of the substrate with a layer produced according to the invention, even if only the borders were to be surfaced with a metal coating. After attaching the metal coating the sections of the layer not being surfaced can in a simple way be returned to their original condition by oxygen supply. It has therefore been suggested to dip the substrate completely into the solution of electrolytes.

On a layer produced according to the invention in such a way metal coatings can be deposited which stick to the layer very well. In particular electro-mechanical processes are also in this case suitable for a simple and economical series production. A substrate coated in such a way can be exposed to high mechanical strains without the metal coating being crumbled away from the layer. A nickel coating can, for instance, be exposed to a tensile force of more than 10 N/sq.mm without being damaged. Such a good adherence has not been reached until now by any one of the known methods, not either by direct electro-chemical metal deposition on a layer consisting of semi-conductive metal oxides alone. The reason for this is most likely a formation of mixed crystals between the semi-conductive metal oxides and/or formation of alloys among the metals.

BRIEF DESCRIPTION OF THE DRAWING

Further advantageous embodiments of the invention are to be seen from the subclaims. The invention will now be described in detail by way of a process embodiment and the accompanying drawings, wherein

DETAILED DESCRIPTION

Figure 1:
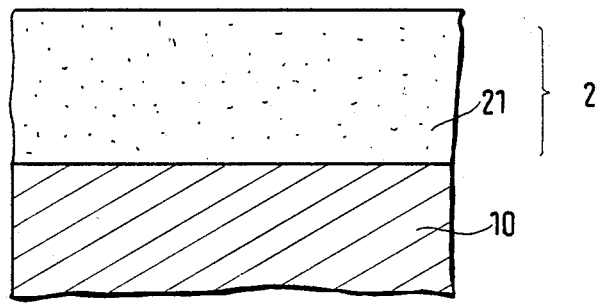
FIGS. 1 to 4 is a diagrammatic view not true to scale of a substrate coated with a layer of semi-conductive metal oxides across its entire surface and its changes during the course of the process according to the invention

FIG. 1 shows part of a substrate 10 consisting of glass which carries a transparent layer 2 of about 50 nm thickness, which layer consists completely of a mixture 21 of indium trioxide and tin(IV) oxide at a mixture ratio of about 5 to 1. Glass substrates coated in such a way are available on the market and are preferably used for the production of electro-optical display devices, wherein the semi-conductive metal oxides serve as a basic material for the electrodes.

Figure 2:
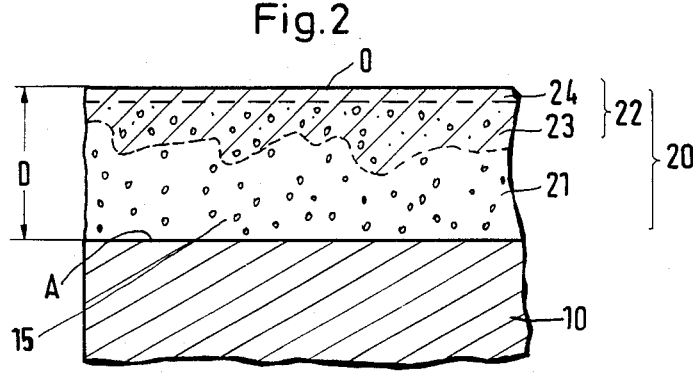

FIG. 2 shows the substrate 10, whose layer 2 has been transformed, however, in a layer 20 according to the invention. Towards its surface O not facing the substrate 10 the layer 20 has an increasing portion 22 of indium and tin. In this case the areas 15 of the layer 20 close to the substrate 10 consist completely of a mixture 21 of indium trioxide and tin(IV) oxide, the portion 22 of indium and tin increases continuously from zero to one hundred percent only from the last fifth to tenth part of the entire layer thickness D towards the surface O of the layer 20. Thus an area 23 is created bordered by broken lines, which area includes a mixture of indium trioxide, tin(IV) oxide, elementary indium and elementary tin and an area 24 which only includes elementary indium and elementary tin alone. As FIG. 2 clearly shows the area 24 is much thinner than the areas 21 and 23 of the layer 20. On this layer 20 a metal coating 30 which is normally used for electro-optical display devices can directly be surfaced. This is shown in FIG. 3.

Figure 3:
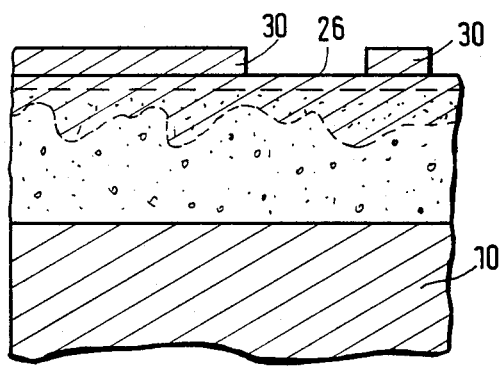
Figure 4:
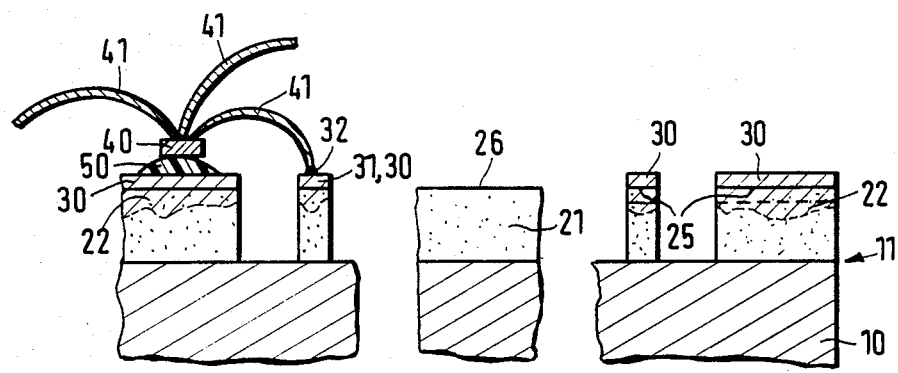
Figure 5:
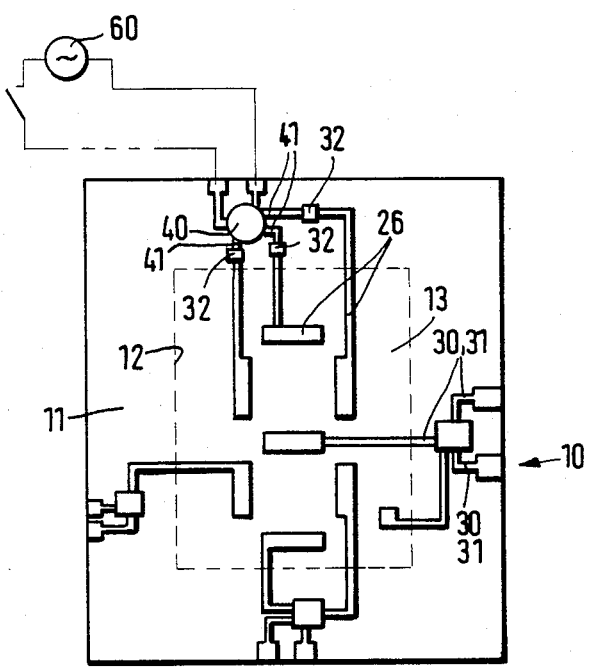
FIG. 5 is a top view on the partly bonded substrate not true to scale.

As FIGS. 3, 4 and 5 show after a further process step the layer 20 only includes permanently a portion 22 of elementary indium and tin in those areas 25 of its surface in which it is covered by a metal coating 30. As FIG. 5 shows the areas 25 with the metal coating 30 are positioned at the borders 11 of the substrate 10 and represent metallised metal conductors 31. The metal conductors 31 extend from one border 11 to an area 13 of the substrate 10 limited by a broken line 12, which area forms the actual indicating area in a completed display device. In this area 13 the remaining areas 26 are positioned, which consist almost completely of a mixture 21 of indium trioxide and tin(IV) oxide, are almost colourless and transparent and form the display electrodes. The metal coating 30 is bonded with an integrated circuit which is realised in an IC chip. As FIG. 4 shows the IC chip 40 is fastened to the metal coating 30 by means of a plastic adhesive 50 and the connecting leads 41 which consist of aluminium and extend from this chip, are welded to the metal conductors 31 in the points 32. The metal conductors 31 are connected to a current supply unit 60 through usual components not shown in the drawing.

In the following embodiment the production of an electro-optical display device according to the invention by using the method according to the invention will be described with reference to the Figs. of the drawing described above.

EXAMPLE

A. Electrolytic reduction

A glass plate 15 by 30 cm large, 2 mm high, coated with a colourless, transparent layer 2 of 50 nm thickness, which layer consists of 5 parts indium trioxide and 1 part tin(IV) oxide (please compare FIG. 1), is completely dipped into a special steel reaction vessel, which contains a 2% hydrous solution of sodium sulphate, to which 0.5% sodium sulphonate has been added. The glass plate 10 is connected to a current supply unit as a cathode and a flat precious steel sheet is switched as an anode and a voltage of about 5 V is applied to the system. Thereby a current density of about 70 mA/sq.dm is achieved and nascent hydrogen is produced from the hydrous solution at the cathode, which hydrogen reduces the indium trioxide to elementary indium and the tin(IV) oxide to elementary tin. Thereby the glass plate is completely pulled out of the solution by means of a motor-driven lifting device.

Not the entire quantities of indium trioxide and tin(IV) oxide are reduced in this manner, but a uniform layer 20 is created across the entire surface of the substrate which layer, seen from the surface O, includes elementary indium and elementary tin to an approximate depth of about 5 to 10 nm (please compare FIG. 2). Now the layer 20 has a slightly brownish metallic lustre. Metal coatings can be surfaced onto this layer 20 in a simple way.

B. Electro-chemical metal deposition

The glass plate treated according to process step A is for a short time washed off with distilled water, dried in the air and its area intended to be used as an indicating area is masked with a polymer lacquer later. The glass plate prepared in such a way is completely dipped into a reaction vessel containing a hydrous nickel sulphate solution with a concentration of 100 g $Ni^{2+}$ ions per liter heated up to 40° C. and having the pH value 5. The glass plate is switched as a cathode and a flat nickel sheet as an anode and a voltage of about 5 V is applied to the system. Thereby a current density of 300 mA/sq.dm is achieved and elementary nickel is deposited on the layer from the nickel sulphate solution. The glass plate is pulled out of the solution at a velocity of 10 cm/min by means of a motor-driven lifting device. Thus a nickel coating is produced which has a thickness of about 5 nm. Now the layer has the appearance as illustrated by FIG. 3 of the drawing.

In this way from a palladium or platinum bath with an acid reaction (10 g $Pd^{2+}$ ions per liter or 10b $Pt^+$ ions per liter, whereby the palladium is preferably a chloride and the platinum a a chlorine complex) and from a bath with an alkaline reaction (pH 9 to 11) gold, silver and copper (concentration 10 to 15 g $Au^{3+}$ ions per liter or 70 g $Ag^+$ ions per liter or 20 g $Cu^+$ ions per liter, whereby the gold is preferably available as a sulphite and the silver and copper preferably as a cyanocomplex) are deposited on the layer.

C. Tempering

The glass plate processed according to process section B is freed from the mask, for a short time washed off with distilled water and at 400° C. exposed to an oxygenous atmosphere. Thus the area of the layer which is not metal-coated is oxidised and again consists almost entirely of indium trioxide and tin(IV) oxide (please compare FIGS. 4 and 5).

D. Subsequent treatment

On the glass plate treated according to process step C the desired electrode and metal conductor patterns are produced by any desired etching process. Thereafter the areas located outside the indicating area are covered with a lacquer mask and the areas of the electrodes located within the indicating area are provided with an orientation layer by dipping into a solution precipitating SiO$_2$, for example an organic hydrosilicon solution. Then the mask is removed and on the corresponding places of the metal coating IC chips are secured by means of an age-hardening plastic adhesive. The aluminium leads originating at the IC chips are connected to the corresponding metal conductors provided with a metal coating in a firmly adherent way by ultrasonic welding (please compare FIGS. 4 and 5).

The glass plate can in a known manner be connected with a glass plate carrying the counter electrodes and be provided with through-connections. The cell formed in such a way can be filled with electro-optically active material and be used as an electro-optical display device in moving objects, for example in motor vehicles.

What is claimed is:

1. An electro-optical display device comprising:
   a substrate;
   a layer disposed on said substrate, said layer comprising a semi-conductive metal oxide which at the intersection of said substrate and said layer is 100% oxide;
   a metallic coating disposed on and adhered to said layer;
   wherein the elemental metal content of said layer adjacent said substrate is less than the elemental metal content thereof adjacent said coating and wherein the last one-fifth to one-tenth thickness of said layer on the side thereof adjacent said coating is of 100% elemental metal content; and,
   a plurality of electrical leads respectively bonded to selected portions of said metallic coating.

2. The device according to claim 1 wherein said metal oxide is tin and/or indium oxide.

3. A method for producing an electro-optical display device comprising the steps of:
   providing a layer of semi-conductive metal oxide on a substrate;
   reducing a portion of the thickness of said layer to form an elementary metal portion extending a given distance from the exposed surface of said layer into said layer;
   masking selected portions of the exposed surface of said layer;
   depositing a metal coating on the elementary metal portion in the areas of the exposed surface which are not masked;
   removing the masking from said selected portions;
   oxidizing the areas of the exposed surface which are not metal coated until the underlying elementary metal is returned to a semi-conductive metal oxide; and,
   adhering a plurality of metallic leads to respective metal coated portions of said layer.

4. The metal according to claim 3, wherein said reducing step includes the step of providing nascent hydrogen to reduce indium trioxide and/or tin oxide to elementary indium and/or tin.

* * * * *